United States Patent Office 2,881,234
Patented Apr. 7, 1959

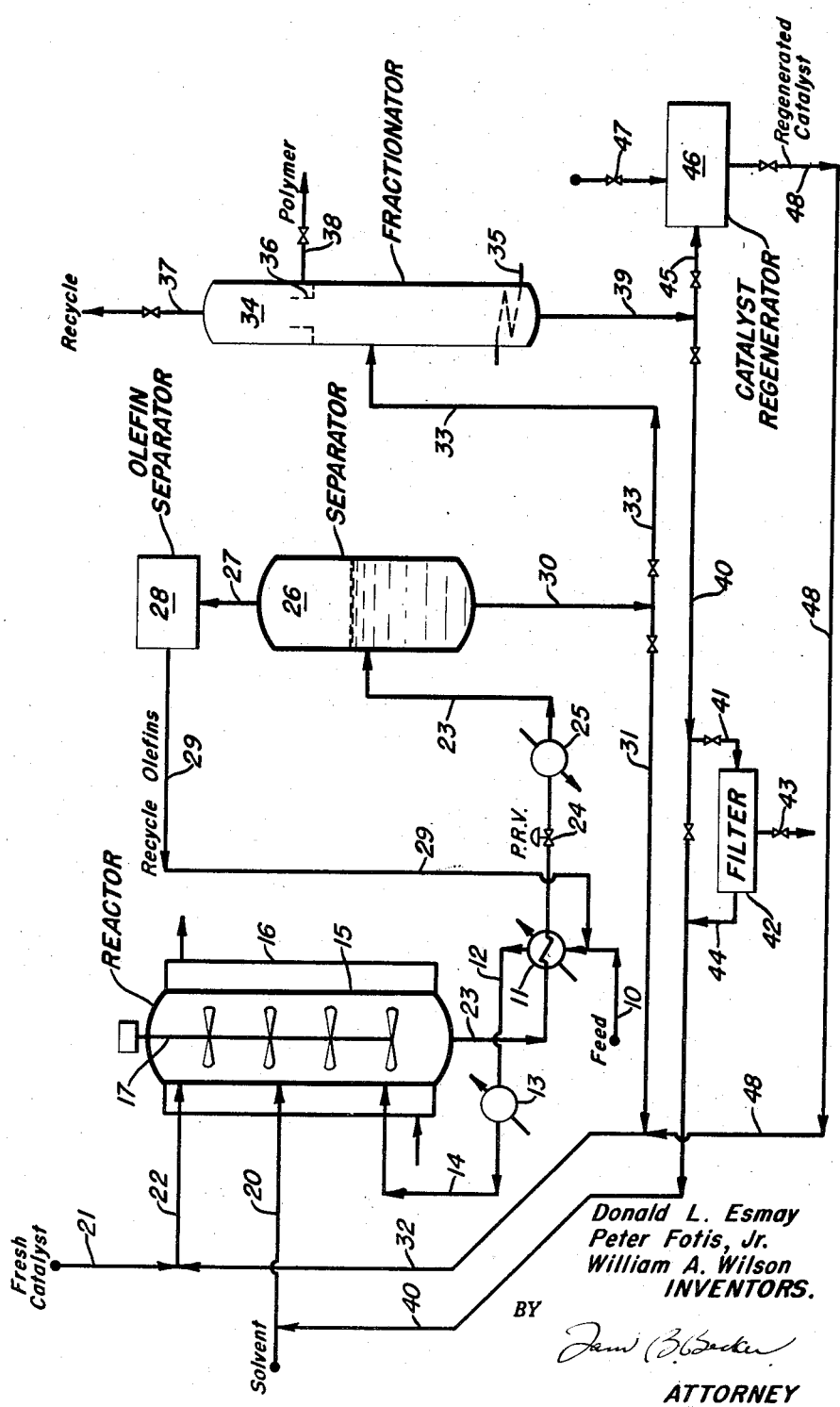

2,881,234

CATALYTIC PROCESS

Donald L. Esmay, Munster, Peter Fotis, Jr., Highland, and William A. Wilson, Griffith, Ind., assignors to Standard Oil Company, Chicago, Ill., a corporation of Indiana Application October 7, 1955, Serial No. 539,054

24 Claims. (Cl. 260—683.15)

This invention relates to a novel catalytic process for the homo- or hetero-polymerization of olefinic hydrocarbons, specifically alkenes having at least 3 carbon atoms per molecule, in the presence of alkali metals supported on porous adsorbent carbon under specified mild operating conditions. The process of the present invention can be applied to produce high yields of unsaturated hydrocarbons boiling within the gasoline boiling range and having high octane numbers. The process of the present invention proceeds at high rates to produce high yields of polymer of relatively low molecular weight, is extremely effective both for homo- and hetero-polymerization of alkenes containing at least 3 carbon atoms per molecule, involves the use of cheap catalysts whose activity can be restored, after use, by a facile method of reactivation and provides other advantages not heretofore known in the art. The products of our invention are, surprisingly, not mixtures of all possible isomers, but are limited to a few isomers. Specificity in the structure of our polymerization products renders them attractive as fuels and chemical intermediates, e. g. as the olefin charging stocks in the OXO process.

It has heretofore been proposed to employ the alkali metals, especially sodium, as catalysts for the polymerization of various unsaturated compounds such as conjugated diolefins (1,3-butadiene) or highly reactive olefins such as styrene, which can even be polymerized by the action of heat alone (K. Ziegler et al., Ann. 473, 57 (1929)). To our knowledge no successful process has heretofore been developed for the homopolymerization of alkenes with an alkali metal or sodium catalyst; only the hetero-polymerization of mixtures of at least 2 alkenes in the presence of alkali metals under extreme conditions (temperatures of at least about 275° C. and pressures of at least about 250 atmospheres) has been described (W. V. Freed, U. S. Patent 2,466,694). The stringent conditions of the Freed process lead to products containing 50% or more olefins having more than ten carbon atoms per molecule, which are not as desirable gasoline components as the lower olefins. The use of a variety of porous supporting materials for alkali metals in polymerization of normally gaseous alkenes has been suggested, such supports being silica, alumina, kieselguhr, pumice, carbon and the like (Freed, infra), although to our knowledge, no experimental data have actually been published on the use of such supported catalysts. The novel process of the present invention, especially the very mild effective operating conditions obtainable with the specified alkali metal-activated carbon catalysts, has not been heretofore disclosed.

Although it has been reported that ethylene can be polymerized by sodium at 150° C., it was later shown that the earlier results and conclusions were erroneous (O. C. Dermer and C. Lathrop, J. Am. Chem. Soc. 61, 750–1 (March 1939)). By the process of the present invention ethylene can be copolymerized very readily under mild operating conditions with alkenes having at least 3 carbon atoms per molecule to produce high yields of copolymers of rather simple constitution, although homopolymerization under otherwise identical conditions proceeds at a very low rate.

One object of the present invention is to provide a novel process for the homopolymerization of alkenes having at least 3 carbon atoms per molecule, especially propylene. Another object is to provide a novel catalytic process for the copolymerization of alkenes having at least 3 carbon atoms per molecule with other alkenes, including ethylene. An additional object is to provide a novel process which is commercially applicable to the synthesis of gasoline boiling range polymers of high octane number by the polymerization of feed stocks comprising essentially an alkene having at least 3 carbon atoms per molecule. A further object is to provide a continuous process for the polymerization of alkenes having at least 3 carbon atoms per molecule with a catalyst of sodium extended upon an activated carbon, in which process partially spent catalyst is withdrawn from contact with the alkene charging stock and is reactivated by methods hereinafter specified, following which the reactivated catalyst is returned to further contact with alkene charging stock. Yet another object is to provide a process for the synthesis of isomeric methylpentenes, especially 2-methyl-2-pentene, by the homopolymerization of propylene in the liquid condition (or in solution in a solvent) in the presence of a sodium-activated carbon catalyst at temperatures between about 50° C. and about 200° C. and pressures which need not exceed about 75 atmospheres. An additional object is to provide a process for the synthesis of 2-pentene and 3-methyl-2-pentene by copolymerization of ethylene and propylene. One more object is to provide olefinic hydrocarbons of defined constitution by the copolymerization of ethylene and isobutylene. The above and other objects of our invention will become apparent from the ensuing description thereof.

Briefly, the process of the present invention comprises contacting an olefinic feed stock comprising essentially an alkene having at least 3 carbon atoms per molecule with an alkali metal supported upon a porous adsorbent carbon under polymerization conditions, including a temperature within the range of about 50° C. to about 200° C. and pressures of 1 atmosphere or more, which may range up to 200 atmospheres. Pressures of 100 atmospheres or 75 atmospheres need not be exceeded in order to obtain excellent homopolymerizations or heteropolymerizations of the specified charging stocks at temperatures within the specified range. Part or all of the alkali metal may be present in the catalyst as alkali metal hydride.

The feed stock for polymerization comprises essentially an alkene having at least 3 carbon atoms per molecule. The homo- and hetero-polymerization of propylene constitutes a distinctly advantageous embodiment of our invention because of the high rate at which propylene polymerization proceeds and because of the relatively simple constitution of propylene homo- and hetero-polymerization products. Under identical operating conditions, the homopolymerization of propylene proceeds about 10 times as fast as the homopolymerization of ethylene and 3 times the rate of homopolymerization of isobutene. Under identical operating conditions, the copolymerization of ethylene and propylene is about 20 to 30 times as fast as the homopolymerization of propylene and much faster than the polymerization of ethylene. A preferred form of heteropolymerization is that of propylene and ethylene which proceeds at a high rate to give products of simple constitution, as will be detailed hereinafter; in contrast, under similar conditions the copolymerization of propylene and isobutylene is relatively slow. The alkene charging stock may consist of or comprise propylene, 1-butene, 2-butene, isobutylene, pentenes (for example, 1- or 2-pentene), hexenes, heptenes, octenes, and in general any normally gaseous or normally liquid alkene having at least 3 carbon atoms per molecule. When copolymerization of two alkenes is effected, the molar ratio of one to the other can vary from 0.1 to 10.

Any of the alkali metals, mixtures of two or more of them, or various alkali metal alloys can be employed for the preparation of catalysts suitable for use in our process. The alkali metals are lithium, sodium, potassium, rubidium, and cesium. The alkali metal is extended upon a porous adsorbent carbon in amounts corresponding to about 3 to about 30 weight percent, based on the total weight of the catalyst, although usually we employ an alkali metal such as sodium in concentrations of about 8 to about 20 weight percent of the total catalyst. The alkali metals or their alloys, e.g. liquid Na-K alloys, can be extended upon the porous adsorbent carbon in any known or desired manner. One convenient method is to heat the support above the melting point of the alkali metal or the alkali metal alloy to be used, then to add the metal or alloy slowly while stirring the mixture Stirring of the mixture can be effected mechanically or by introducing a stream of inert gas as a fluidizing agent into the mixture of powdered carbon and molten alkali metal or alloy. After the metal or alloy has become evenly dispersed, the mixture can be cooled and transferred to a reactor. All steps of the preparation should be carried out under a blanket of an inert gas, such as helium, nitrogen, etc. If it is desired to convert all or part of the alkali metal which is extended upon the carbon support to alkali metal hydride, the catalyst is treated with hydrogen at suitable temperatures, e.g. about 50° C. to about 300° C. either in the reactor or elsewhere.

The adsorbent carbons or activated carbons which we employ to prepare catalysts have high surface areas, usually between about 700 and about 1200 square meters per gram, relatively large pore volumes, for example, about 0.53 to about 0.58 cc. per gram and relatively large pore diameters, for example, about 20 to 30 A units and, in some instances, contain small amounts of combined oxygen. A particularly fine activated carbon for use in our invention is activated coconut charcoal, although wood charcoals and other activated carbons in general can be employed. If desired, the activated carbon can be pretreated with nitric acid as described in E. F. Peters U.S. Patent 2,692,295, although this pretreatment is not essential to obtain active catalysts for our purposes In effecting the process of our invention, temperatures within the range of about 50° C. to about 200° C. can be employed although more often the operating temperature is selected between about 100° C. and about 175° C., specifically at or about 150° C. The polymerization process can be effected at atmospheric or superatmospheric pressures, for example, at pressures up to about 200 atmospheres, although we have noted that no substantial advantage accrues to operating at pressures above about 100 atmospheres. Most often, polymerization is conducted at pressures between about 10 and about 75 atmospheres. In general, we prefer that the alkene charging stock having at least 3 carbon atoms per molecule be present in the reaction zone in the liquid condition, i.e. as a liquid or as a solution of said alkene in a substantially inert hydrocarbon material. Stated another way, we prefer not to exceed the critical temperature of the alkene feed stock having three or more carbon atoms or the pseudo-critical conditions for the solution of said alkene feed in the liquid reaction medium.

While not prerequisite, it may be desirable and beneficial in some cases to use an inert reaction medium, such as liquid saturated hydrocarbons, e.g., pentane, hexanes, heptanes, octanes, dodecane, cyclohexane, etc. Aromatic solvents such as benzene, toluene, xylenes, ethylbenzene, etc. may be used, although some alkylation thereof by the olefin feed may occur. The concentration of alkene(s) in said reaction medium can range upwardly from about 5 weight percent, and may be, e.g , about 20 to about 50 weight percent. Also, the process of this invention can be readily carried out with feed stocks containing inert hydrocarbons; for example, plant stream mixtures of olefins and paraffins can be used satisfactorily. In all cases, feed stocks should be used which are as free as possible of impurities that will react with the alkali metal component of the catalyst and thereby destroy catalyst activity.

The polymerizations can be carried out in either batch or flow reactors. The nature of the catalyst makes it usable in either fixed bed or fluidized bed flow processes. In carrying out flow reactions, the space velocity can be in the range of about 0.2 to about 10, preferably about 0.5 to about 2, volumes of feed per volume of catalyst per hour. In effecting batch polymerization operations, the operating period may range from about 0.5 to about 20 hours.

Upon completion of the desired polymerization reaction, the liquid products (and liquid reaction medium) are separated by conventional methods such as settling, filtration, decantation or centrifuging, or other known methods from the powdered or granular catalyst and unreacted components of the feed stock, fractionally distilled into desired fractions and withdrawn for such further treatment as may be desired, for example, washing with water, alcohols or other hydroxylic agents, contacting with clays, adsorptive carbon or the like, etc. The separated catalyst can be returned with the inert reaction medium to the polymerization reactor or all or a portion of the partially spent catalyst can be treated to effect its reactivation as will be described hereinafter in connection with the accompanying figure.

In what follows, the invention will be described in greater detail with reference to a continuous commercial method of practicing the invention and reference to specific illustrative examples in which the process of our invention has been effected.

In the accompanying figure, the alkene feed stock, for example, propylene or a mixture of propylene and ethylene, is introduced through line 10 into heat exchanger 11, thence through line 12 and heater 13 through line 14 into a suitable polymerization reactor 15. The reactor 15 is provided with a heating mantle 16 (or other heating arrangement) containing a circulating thermophoric fluid and agitating equipment 17 to effect suitable contacting of the alkene, liquid reaction medium and catalyst.

Liquid, substantially inert reaction medium is introduced by line 20 into an intermediate zone in reactor 15. A suitable medium is, for example, a relatively high boiling alkane, boiling somewhat above the boiling range of the polymerization product formed in reactor 15 In the given instance of propylene homoploymerization or copolymerization with ethylene, a desirable solvent is dodecane.

Fresh catalyst, which is suitably a slurry of about 15 weight percent sodium on an activated coconut charcoal, slurried in an inert liquid reaction medium such as is introduced through line 20, is introduced into reactor 15 through lines 21 and 22 into an upper zone thereof or, if desired, into a plurality of zones in said reactor by other lines (not shown).

The polymerization can be effected, for example, at temperatures in the range of about 140 to 160° C. under pressures between about 350 and about 1500 p.s.i.g., for example, at approximately 1000 p.s.i.g. Suitable residence times of the alkene feed stock in reactor 15 range from about 0.1 to about 10 hours.

Upon completion of the desired polymerization reaction, the reaction mixture is withdrawn from reactor 15 through line 23 and heat exchanger 11, thence through pressure reducing valve 24 into cooler 25, from which it passes into a separating vessel 26. Volatilized alkene and associated alkane, derived from the unreacted feed stock, together with some of the liquid reaction medium, passes overhead from separator 26 through line 27 into olefin separation equipment indicated schematically at 28. The olefin separation equipment is conventional and may involve fractional distillation equipment and/or solid or liquid absorption equipment to segregate olefin components from the recycle stream entering by line 27. The olefin concentrate produced in equipment 28 is withdrawn therefrom by line 29 and recirculated to line 10 for further treatment in polymerization reactor 15.

The liquids-solids mixture in the lower portion of separator 26 is withdrawn therefrom through line 30, whence all or a portion thereof can be recirculated through lines 31, 32 and 22 to reactor 15. However, a substantial proportion of the mixture in line 30 is passed through line 33 into fractionating tower 34 provided with a reboiler coil 35 and a trapout plate 36.

Any relatively low boiling hydrocarbon materials which escape vaporization in separator 26 pass overhead of fractionator 34 through valved line 37. The usual refluxing arrangements may be used but are omitted for simplification. A portion of the net overhead can be recycled directly (by lines not shown) to reactor 15 or, preferably, through olefin separation equipment 28, or withdrawn wholly or in part from the system.

The polymer product concentrates on trapout tray 36, whence it is withdrawn through a valved line 38 for refractionation or such further treatment or application as may be desired. The propylene homopolymers and heteropolymers produced by our process are characterized by high octane numbers (research method, CFR-R) in the range of about 90 to 96 and are desirable components of automobile or aviation piston engine fuels.

A slurry of powdered or granular catalyst and liquid reaction medium, which can contain small proportions of relatively high boiling polymer, is withdrawn from the lower portion of fractionator 34 through line 39, whence at least a portion thereof can be recycled through valved line 40 into line 20, thence to reactor 15. If desired, a portion or all of the stream passing through line 40 can be diverted through valved line 41 into filter 42 or equivalent solids-liquids separating means. Partially spent or spent catalyst is withdrawn from filter 42 through valved line 43. If desired, part or all of the catalyst withdrawn through line 43 can be treated to reactivate it in catalyst regeneration equipment 46. Liquid reaction medium is passed through line 44 into line 40 for recycle to reactor 15.

Alternatively, part or all of the liquid medium-catalyst slurry from line 39 can be diverted through valved line 45 into equipment for catalyst regeneration 46, indicated schematically in the figure.

In equipment 46 the slurry of catalyst in liquid medium can be treated with hydrogen introduced therein through valved line 47, at temperatures ranging between about 50° C. and about 300° C. and hydrogen partial pressures ranging upwardly from about 10 atmospheres, for example, between about 50 and about 100 atmospheres to effect reactivation of the catalyst. The treating period generally varies from about 0.1 to about 10 hours, depending on the extent to which the catalyst has become deactivated before treatment, the nature of the impurities in the catalyst, the degree of reactivation which is sought, etc. Conventional contacting equipment can be employed in effecting reactivation of the catalyst. Alternatively or in addition, the catalyst can be separated from the associated liquid reaction medium and subjected to evacuation, for example, pressures of the order of about 0.001 to about 1.0 mm. of mercury at temperatures between about 50° C. and about 300° C. for about 0.1 to about 10 hours. The reactivated catalyst with associated liquid medium or with an added liquid medium passes as a slurry through valved line 48 into line 32, thence through line 22 into reactor 15.

It will be understood by one skilled in the art that various departures may be made from the equipment and flow schemes which have been illustrated in the figure. Thus, the slurry of used catalyst in the solvent and liquid polymerization products (in line 30) can be separated by conventional means, such as filtration, prior to effecting product fractionation. The separated catalyst can be recycled to reactor 15, after regeneration if desired.

The following examples are introduced in order to specifically illustrate our invention without the intention of unnecessarily limiting the same. In Table 1 are summarized data obtained in batch homopolymerizations of olefins with supported sodium catalysts. In each case the catalyst was prepared by stirring the indicated quantity of molten sodium at 250° C. with the adsorbent supporting material in an atmosphere of helium and the resultant catalysts were transferred under said helium blanket to a 250 ml. Magne-Dash reactor, which is a stainless steel autoclave provided with a magnetically-actuated stirrup-type agitator. Autogenous pressures in the range of about 100 to 500 p.s.i.g. were used.

TABLE 1

*Homopolymerization of olefins*

[Charcoal support—10 g.; Na—2 g.; temp—140° C.]

| Example No. | Olefin. g. | Solvent (ml.) | Time, hr. | Conversion olefin, Weight percent | Product |
|---|---|---|---|---|---|
| 1 | $C_2H_4$, 15 | $C_{12}H_{26}$ (100) | 22 | 30 | 5 ml. olefins B.P. 124–188° C.; trace of solid. |
| 2 | $C_3H_6$, 40 | $C_6H_6$ (100) | 6.5 | 90 | Mostly $C_6$ olefin [a]. |
| 3 | 2-$C_4H_8$, 35 | $C_6H_6$ (100) | 5 | 20 | Octenes.[b] |
| 4 | 2-$C_4H_8$, 35 | $C_{12}H_{26}$ (100) | 5 | 20 | Do.[b] |
| 5 | iso-$C_4H_8$, 34 | $C_{12}H_{26}$ (60) | 17 | 67 | Octenes+some dodecenes. |
| 6[c] | iso-$C_4H_8$, 41 | $C_{12}H_{26}$ (60) | 16 | 53 | Do. |
| 7[c] | iso-$C_4H_8$, 57 | $C_{12}H_{26}$ (60) | 20 | 63 | Do. |
| 8[d] | $C_3H_6$, 40 | n-$C_5H_{12}$ (50) | 15 | 95 | 63% hexenes and 37% nonenes. |
| 9[c] | 1-$C_5H_{10}$, 64.4 | None | 20 | 18 | 86 v. percent decenes; remainder boils higher. |
| 10[e] | 1-$C_8H_{16}$, 72.1 | do | 68 | 18 | ca. 100% hexadecenes; $n$ 20/D 1.4523. |

[a] Over 60 vol. percent of the $C_6$ olefinic material was 2-methyl-2-pentene with the remainder being the other isomeric 2-methylpentenes.
[b] By mass spectrometer analysis, about 10% of the total liquid product was octenes.
[c] Run made at 200° C.
[d] 2 g. K on 10 g. charcoal.
[e] Polymerization at 250° C.

The results obtained in Run 1 indicate that ethylene homopolymerization under these conditions proceeds very slowly and only high-boiling products rather than dimers could be isolated. Run 2 illustrates the fact that the sodium-charcoal catalyst converts propylene at a very high rate to produce methylpentenes, of which 2-methyl-2-pentene was the predominant isomer. In Runs 3 and 4, 2-butene was converted to octenes. In Runs 5, 6 and 7, isobutylene was converted to octenes and dodecenes although the rate of polymerization was substantially less than the rate of propylene polymerization even though a substantially higher temperature was employed. In Run 8 propylene was polymerized with a potassium-charcoal catalyst to yield hexenes and nonenes.

Examples 9 and 10 illustrate homopolymerization of normally liquid alkenes. Dimerization was the principal reaction in each instance.

In Table 2 are summarized the results of flow runs carried out on the polymerization of propylene. The flow unit consisted of a positive displacement-type pump (about 120-ml. capacity), a vertical stainless steel tube reactor (about 100-ml. capacity), and a receiving vessel (a 500-ml., round-bottomed glass flask). The unit was equipped with the necessary valves, gauges, rupture disc, etc. The feed was pumped into the reactor and downflow over the catalyst into the receiving vessel. The reactor was equipped with a suitable heater. The receiving flask was immersed in an acetone-Dry Ice bath and was equipped with an acetone-Dry Ice condenser. Any gas passing through the condenser was then passed through a rotameter, a wet test meter and finally vented. The product which collected in the receiving vessel was stabilized (to 0° C.) and the weights of recovered feed and of products were determined. The desired pressure was maintained by manual operation of a valve between the reactor and the receiving vessel. The catalysts were prepared at about 250° C. using the conventional technique for preparing "high surface sodium."

TABLE 2.—RUN 11

*Propylene polymerization over high surface sodium on charcoal*

[140° C.; 600±25 p.s.i.g. Catalyst: 6 g. Na on 30 g. charcoal (Burrell Co.; 12-20 mesh).]

| Product fraction | Reactor temp., °C.[a] | Approx. LHSV | Time,[b] hr. | Recovered propylene, g.[c] | Polymer[d] | | | Conversion propylene, weight percent |
|---|---|---|---|---|---|---|---|---|
| | | | | | Ml. | G. | n 20/D | |
| 1 | 148 | 0.45 | 4 | 12 | 63.5 | 44 | 1.4029 | 80 |
| 2 | 147 | 0.45 | 4 | 12 | 56 | 39 | 1.3995 | 76 |
| 3 | 149 | 0.45 | 4 | 13 | 71 | 49 | 1.3990 | 79 |
| 4 [e] | 143 | 0.9 | 2 | 40 | 31 | 22 | 1.3949 | 36 |
| 5 | 141 | 0.9 | 2 | 40 | 25 | 17 | 1.3948 | 30 |
| 6 | 141 | 0.9 | 2 | 43 | 24.5 | 17 | 1.3935 | 28 |
| 7 [e] | 140 | 0.9 | 2 | 44 | 20.5 | 14 | 1.3948 | 24 |
| 8 | 140 | 0.9 | 2 | 45 | 20 | 14 | 1.3939 | 24 |
| 9 | 140 | 0.9 | 2 | 44 | 19 | 13 | 1.3935 | 23 |
| 10 [f] | 155 | 0.9 | 2 | 13 | 71 | 49 | 1.4018 | 79 |
| 11 | 151 | 0.9 | 2 | 27 | 55 | 38 | 1.3968 | 59 |
| 12 [e] | 146 | 0.9 | 2 | 34 | 34 | 24 | 1.3958 | 41 |
| 13 | 143 | 0.9 | 2 | 39 | 31 | 21 | 1.3940 | 35 |
| 14 | 140 | 0.9 | 2 | 42 | 26 | 18 | 1.3948 | 30 |
| 15 [g] | 150 | 0.9 | 2 | 25 | 55 | 38 | 1.3978 | 60 |
| 16 | 146 | 0.9 | 2 | 33 | 40 | 28 | 1.3959 | 46 |
| 17 | 145 | 0.9 | 1.3 | 24 | 24 | 17 | 1.3951 | 41 |
| 18 [f] | 152 | 0.9 | 2 | 22 | 51 | 36 | 1.3980 | 62 |
| 19 | 148 | 0.9 | 2 | 31 | 45 | 31 | 1.3958 | 50 |
| 20 | 146 | 0.9 | 1.8 | 26 | 33 | 24 | 1.3965 | 48 |
| 21 [g] | 144 | 0.9 | 2 | 40 | 29 | 21 | 1.3951 | 34 |
| 22 | 141 | 0.9 | 2 | 42 | 26 | 19 | 1.3947 | 31 |
| 23 [f] | 143 | 0.9 | 2 | 43 | 25 | 17 | 1.3955 | 28 |
| 24 | 143 | 0.9 | 2 | 42 | 25 | 17 | 1.3968 | 29 |
| 25 [h] | 149 | 0.9 | 2 | 36 | 35 | 24 | 1.3981 | 40 |
| 26 | 146 | 0.9 | 2 | 34 | 28 | 20 | 1.3967 | 37 |
| 27 [i] | 147 | 0.9 | 2 | 47 | 26 | 19 | 1.3970 | 29 |
| 28 | 145 | 0.9 | 2 | 47 | 24 | 16 | 1.3961 | 25 |
| 29 [h] | 142 | 0.9 | 2 | 46 | 25 | 17 | 1.3952 | 27 |
| 30 | 141 | 0.9 | 2 | 46 | 24 | 16 | 1.3955 | 26 |
| 31 [e] | 142 | 0.9 | 2 | 47 | 20 | 14 | 1.3941 | 23 |
| 32 | 141 | 0.9 | 2 | 50 | 20 | 14 | 1.3951 | 22 |
| 33 | 138 | 0.9 | 2 | 48 | 17 | 12 | 1.3950 | 20 |
| 34 | 137 | 0.9 | 2 | 50 | 16 | 11 | 1.3945 | 18 |

[a] Thermocouple approximately in center of catalyst bed.
[b] Length of time after take-off started or after preceding cut.
[c] Overhead from stabilization to 0° C.
[d] Bottoms from stabilization to 0° C.
[e] After shutting down overnight.
[f] After catalyst "soaked" in hydrogen overnight at 1000 p.s.i.g. and 200° C., then evacuated at 2-3 mm. Hg while bringing temperature down to 140° C. The catalyst contains NaH.
[g] After catalyst evacuated overnight at 200° C. at 2-3 mm. Hg.
[h] After catalyst "soaked" in hydrogen for 2 days at 300° C. and 1000 p.s.i.g., then evacuated at 2-3 mm. Hg overnight at 300° C.
[i] After pumping about 120 ml. of xylenes over the catalyst at 150° C. and 300 p.s.i.g. during about 2 hrs., followed by overnight evacuation at 2-3 mm. Hg and 200° C.

Table 2 summarizes the data of a flow run in which catalyst activity maintenance was good. The conversion level stayed above 75 weight percent for 12 hours at which time the unit was shut down overnight. On continuing the run at a doubled flow rate, catalyst activity was observed to fall off slowly. However, it was found that hydrogen treatment and/or evacuation at 200° C. to 300° C. regenerated catalyst activity. The total yield of polymer isolated was 790 g. This represents about 130 g. of polymer per g. of sodium or about 22 g. of polymer per g. of sodium plus charcoal. Considerable polymer was lost in carrying out the regenerations, but this loss can easily be obviated in a commercial polymerization plant.

Inspections on representative samples of the polymer obtained from the flow run showed CFR-R octane numbers of 95.5-96.5.

Table 3 summarizes the results of a flow run using "high surface sodium" on alumina as the catalyst. The conversion level was found to be much lower than that obtained with a charcoal support under the same conditions (22 weight percent as compared to 80 weight percent). Substantially increasing the temperature and pressure increased the conversion with the alumina-supported catalyst, but the conversions were still quite low. In addition, catalyst deactivation was quite rapid.

TABLE 3.—RUN 12

*Propylene polymerization over high surface sodium on alumina*

[Catalyst: 5 g. Na on 50 g. Al₂O₃ (from Indiana alumina gel, U.S.P. 2,274,634; Re. 22,196); 0.45 LHSV; fractions taken every 4 hrs.]

| Product fraction | Temp., °C. | Pressure, p.s.i.g. | Recovered propylene, g. | Polymer | | | Propylene conversion, weight percent |
|---|---|---|---|---|---|---|---|
| | | | | Ml. | g. | n 20/D | |
| 1 | 143 | 600 | 47 | 19 | 13 | 1.3967 | 22 |
| 2 | 134 | 1,000 | 43 | 13 | 9 | 1.3954 | 17 |
| 3 | 134 | 1,000 | 51 | 15 | 10 | 1.3978 | 16 |
| 4 | 156 | 1,000 | 49 | 19 | 13 | 1.3970 | 21 |
| 5 | 156 | 1,000 | 47 | 8 | 5 | 1.3970 | 10 |
| 6 | 156 | 1,000 | 72 | 5 | 3 | 1.3981 | 4 |
| 7 | 190 | 1,000 | 67 | 7 | 4 | 1.4000 | 6 |

In Table 4 are presented data obtained in the heteropolymerization (copolymerization) of alkene charging stocks, one of which contains at least 3 carbon atoms per molecule. The polymerization operations of Table 4 were carried out in a 250 ml. Magne-Dash reactor.

The results of Examples 13 and 14 show that neither charcoal nor a sodium dispersion in oil is effective for catalyzing the copolymerization of ethylene and propylene at 140° C. and 1000 to 1500 p.s.i.g. Example 15 shows that sodium supported on silica was ineffective as a catalyst. In Example 16 the sodium and charcoal were placed in the reactor separately. After an induction period of about 4 hours, reaction of ethylene with propylene was obtained at 140° C. and 1500 p.s.i.g. The induction period was probably required for the formation of sufficient "high surface sodium" in situ to catalyze the reaction.

In Example 17, it was demonstrated that a solvent was not essential for the copolymerization of ethylene and propylene at 140° C. and 1300 p.s.i.g. However, a larger amount of C₁₀₊ olefins was obtained than in any of the ethylene-propylene runs in which a solvent was used. The results of Example 18 show that ethylene and propylene react at 70° C. and 800 p.s.i.g. to give over 80 wt. percent conversion of the propylene in 20 hours. In this run about 80 vol. percent of the product was 2-pentene and no material above hexenes was isolated. Thus, control of product composition can be effected by control of reaction temperature.

TABLE 4

Olefin copolymerizations over supported sodium

| Run No. | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|
| Support | a O | None | SiO₂ | a O | a O | a O | a O | a O | p O | p O | r O | a O | a O | a O | a O | a O | a O |
| Support, g | 10 | 0 | 10 | 10 | 10 | 10 | 10 | 10 | 10 | 10 | 10 | 10 | 10 | 10 | 10 | 10 | 10 |
| Sodium, g | 2 | c 2 | 2 | d 2 | 2 | 2 | 2 | 2 | 1 | 2 | 2 | 2 | 2 | 2 | 2 | 2 | 2 |
| Olefin A, g | C₃ | C₃ | C₃ | C₃ | C₃ | C₃ | C₃ | C₃ | C₃ | C₃ | C₃ | C₃ | C₃ | C₃ | C₃ | C₃ | C₃ |
| Olefin A, g | 23 | 15 | 13 | 24 | 28 | 24 | 20 | 42 | 33 | 63 | 39 | 30 | 46 | 45 | 41 | 52 | 12 |
| Olefin B | C₃ | C₃ | C₃ | C₃ | C₃ | C₃ | C₃ | C₃ | C₃ | C₃ | C₃ | 1-C₄ | 2-C₄ | iso-C₄ | iso-C₄ | 2-C₄ | C₃ |
| Olefin B, g | 23 | 22 | 21 | 39 | 41 | 41 | 28 | 23 | 27 | 25 | 21 | 28 | 22 | 35 | 27 | v 65 | 30 |
| Solvent | C₁₂H₂₆ | e Oil | C₁₂H₂₆ | C₁₂H₂₆ | None | C₁₂H₂₆ | C₁₂H₂₆ | C₁₂H₂₆ | C₁₂H₂₆ | C₁₂H₂₆ | C₁₂H₂₆ | C₁₂H₂₆ | C₁₂H₂₆ | C₁₂H₂₆ | C₁₂H₂₆ | None | C₁₂H₂₆ |
| Solvent, ml | 50 | 50 | 50 | 50 | | 50 | 100 | 50 | 50 | 50 | 50 | 50 | 50 | 100 | 50 | 140 | 50 |
| Temp., °C | 140 | 140 | 140 | 140 | 140 | 70 | 137 | 140 | 120 | 120 | 140 | 140 | 140 | 120 | 140 | | 120 |
| Time, hrs | 16 | 4.5 | 18 | 22 | 21 | 20 | 0.7 | 6 | 18 | 5.5 | 19 | 19 | 0.5 | 2.5 | 5 | 0.5 | 5 |
| Max. press., p.s.i.g | 1,400 | 1,200 | 1,160 | 1,500 | 1,300 | 800 | 800 | 1,100 | 1,375 | 1,125 | 1,600 | 1,150 | 900 | 750 | 600 | 900 | 1,200 |
| Total Δ p.s.i | 0 | 0 | 0 | 1,250 | 1,065 | 530 | ≥1,000 | 1,325 | 675 | 495 | 905 | 425 | 940 | 3,200 | 410 | 1,400 | 3,200 |
| Max. Δ p.s.i./hr | 0 | 0 | 0 | h 300 | 2,400 | 100 | ≥1,500 | >5,000 | 1,500 | >1,800 | 400 | 500 | >6,000 | >3,500 | 200 | >4,800 | 1,800 |
| Conversion, weight percent: | | | | | | | | | | | | | | | | | |
| Olefin A | 0 | 0 | 0 | 100 | 83 | 80 | 96 | 83 | 85 | 95 | 90 | 93 | 80 | 100 | ≥95 | 92 | 100 |
| Olefin B | 0 | 0 | 0 | 100 | | | | 96 | | | | | 100 | | ≥95 | 100 | |
| Liquid: | | | | | | | | | | | | | | | | | |
| Ml | 45 | | 40 | 109 | c 58 | i 82 | 138 | n 105 | 95 | 130 | 92 | 88 | 93 | u 179 | v 100 | 112 | 142 |
| n 20/D | b 1.4212 | | b 1.4213 | | 1.3934 | 1.4019 | 1.4117 | 1.4150 | 1.4098 | 1.4245 | 1.4130 | 1.4128 | 1.4280 | 1.4216 | 1.4090 | | |
| Distil'n, v. percent k: | | | | | | | | | | | | | | | | | |
| C₅ | | | | | | | | 9 | | | | | | | | 0 | 3 |
| C₆ or C₆+ | | | | | c 22 | 80 | 174 | | | | | 80 | | | x 54 | | |
| C₇ | | | | | f 41 | 20 | | o 52 | | | | | | | v 46 | 25 | 28 |
| C₈ or C₈+ | | | | | | | m 26 | | | | | | 25 | v 51 | Trace | | |
| C₉ or C₉+ | | | | | | | | | | | | 20 | | | | | |
| C₁₀ or C₁₀+ | | | | | g 15 | | | 30 | | | | | | | | 60 | 49 |
| C₁₁ or C₁₁+ | | | | | z 22 | | Trace | 9 | | | | | 66 | v 49 | | | |
| C₁₂ or C₁₂+ | | | | | | | | | | | | | 10 | Trace | | 10 | i 20 |
| C₁₃+ | | | | | | | | | | | | | | | | 15 | | a Powdered Burrell coconut charcoal (about 80-100 mesh/inch).
b Feed dodecane, n 20/D 1.4213.
c Dispersed in white oil.
d Charcoal and sodium added separately.
e Distillation showed 49 wt.% pentene-2 with the remainder C₆+ olefinic material.
f Mostly 3-ethylpentene-2 by infrared.
g Mixture of vinyl, trans-internal, and branched terminal olefins by infrared.
h After an induction period of about 4 hours.
i Distillation showed 38 wt.% 2-pentene.
j The sodium on charcoal was reacted with hydrogen at 360° C. for one-half hour before charging to the reactor, to produce sodium hydride on charcoal.
k Vol.% of material other than the solvent.
l Mostly 2-pentene by infrared.
m 3-ethyl-2-pentene major component by infrared.
n Distillation showed 5 wt.% pentene-2, rest C₆+.
o Over 90 v.% 3-ethyl-2-pentene by infrared.
p Burrell charcoal, 12-20 mesh/inch.
q Pressure falling while temp. rising due to exothermic reaction.
r Pittsburgh Coke & Chemical Co. granular charcoal (about 10-20 mesh/inch).
u Infrared showed predominant olefin type to be branched terminal olefin.
v Infrared showed branched terminal and tri-substituted olefins as predominant types.
x Infrared showed internal, branched terminal and tri-substituted olefins present.
y Mostly propylene dimer, 2-methyl-2-pentene.
z 100 ml.
i All C₁₁.

The results of Examples 19 and 20 demonstrate that the ratio of ethylene to propylene used has an effect on the product distribution. Increasing the relative amount of ethylene increases the ratio of nonenes to heptenes and to pentenes. The use of a more granular charcoal (12-20 mesh) in Examples 21 and 22 gave results indicating that the larger the particle size of the support, the slower the reaction rate. Also, the use of 2 g. of sodium on 10 g. of charcoal appeared to give a better reaction rate than 1 g. of sodium on 10 g. of charcoal. Example 23 showed that charcoals other than Burrell can be used as supports.

Examples 24-28, inclusive, demonstrate that mixtures of ethylene and 1- or 2-butene, ethylene and isobutylene, propylene and isobutylene, and ethylene and 2-pentene, respectively, can be satisfactorily copolymerized at 120° C. to 140° C. and 600 p.s.i.g. to 900 p.s.i.g. In all cases, conversion of the butene or pentene was over 95 wt. percent. Product distillations showed that olefins predominating in definite carbon-skeleton types were formed. Thus in Example 26 (ethylene-isobutylene copolymerization) the octene portion of the product is about 30 v. percent branched terminal olefin of one structure (probably 3-n-propyl-1-pentene), about 30 v. percent of trisubstituted olefin of one structure (probably 2,5-dimethyl-2-hexene) and the remainder probably mostly a mixture of these two compounds. Lack of reference spectra prevented definite identification of the compounds in the octene and higher ranges.

Example 29 illustrates the well-defined copolymerization of propylene with ethylene which results in the presence of a sodium hydride-activated charcoal catalyst. Reaction was continuing at the time of shut down, when about 4 mol of ethylene per mol of propylene had been consumed in the reaction.

Having thus described our invention, what we claim is:

1. A process for the polymerization of an olefinic feed stock selected from the class consisting of normally gaseous and normally liquid alkenes having at least 3 carbon atoms per molecule, which process comprises contacting said feed stock with a catalyst consisting essentially of an alkali material supported upon a porous adsorbent carbon, said alkali material being selected from the group consisting of alkali metal and alkali metal hydride, effecting said contacting at a temperature between about 50° C. and about 200° C., and recovering a polymer thus produced.

2. The process of claim 1 wherein said alkali material is an alkali metal.

3. The process of claim 2 wherein said alkali metal is sodium.

4. The process of claim 1 wherein said alkali material is an alkali metal hydride.

5. The process of claim 4 wherein said hydride is sodium hydride.

6. The process of claim 1 wherein said feed stock comprises propylene.

7. The process of claim 1 wherein said alkene is a normally gaseous alkene.

8. The process of claim 1 wherein the feed stock alkenes consist of propylene and ethylene.

9. The process of claim 1 wherein the feed stock alkenes consist of propylene and isobutylene.

10. The process of claim 1 wherein the feed stock alkenes consist of ethylene and 2-butene.

11. The process of claim 1 wherein the feed stock alkenes consist of ethylene and 2-pentene.

12. A process for the polymerization of an olefinic feed stock selected from the class consisting of normally gaseous and normally liquid alkenes having at least 3 carbon atoms per molecule, which process comprises contacting said feed stock and an added liquid, substantially inert hydrocarbon reaction medium with a catalyst consisting essentially of an alkali material supported upon a porous adsorbent carbon, said alkali material being selected from the group consisting of an alkali metal and an alkali metal hydride, effecting said contacting at a temperature between about 50° C. and about 200° C., and recovering a polymer thus produced.

13. The process of claim 12 wherein said alkali material is an alkali metal.

14. The process of claim 13 wherein said alkali metal is sodium and said polymerization is conducted at a pressure between about 25 and about 100 atmospheres.

15. A process for the polymerization of an olefinic feed stock selected from the class consisting of normally gaseous and normally liquid alkenes having at least 3 carbon atoms per molecule, which process comprises contacting said feed stock with a catalyst consisting essentially of an alkali material supported upon a porous adsorbent carbon, said alkali material being selected from the group consisting of an alkali metal and an alkali metal hydride, effecting said contacting at a temperature between about 50° C. and about 200° C., continuing said contacting until the polymerization activity of said catalyst is substantially decreased, withdrawing such partially spent catalyst from further contact with said feed stock, contacting said partially spent catalyst with hydrogen under reactivation conditions including a temperature between about 50° C. and about 300° C. and hydrogen under superatmospheric pressure thereby substantially increasing the alkene polymerization activity of said catalyst, and returning reactivated catalyst to further contact with said feed stock.

16. The process of claim 15 which includes the additional catalyst reactivation step of evacuating partially spent catalyst at a temperature between about 50° C. and about 300° C. at a pressure below about 5 mm. of mercury.

17. A process for the production of liquid polymer within the gasoline boiling range, which process comprises contacting a feed stock consisting essentially of a normally gaseous alkene, having at least 3 carbon atoms per molecule, in liquid condition with a catalyst consisting essentially of sodium in a concentration between about 3 and about 30 weight percent supported upon an activated charcoal, effecting said contacting at a temperature between about 50° C. and about 200° C. under pressure sufficient at least to maintain said alkene in liquid condition and below about 100 atmospheres, and recovering said polymer boiling within the gasoline boiling range.

18. The process of claim 17 wherein said alkene comprises propylene.

19. A process for the preparation of methylpentenes, which process comprises contacting a feed stock consisting essentially of propylene in the liquid condition with a catalyst consisting essentially of sodium in a concentration between about 3 and about 30 weight percent supported upon an activated charcoal, effecting said contacting at a temperature between about 50° C. and about 200° C. under pressure sufficient at least to maintain propylene in said liquid condition, and recovering methylpentenes thus produced.

20. A process for the homopolymerization of an alkene selected from the class consisting of normally gaseous and normally liquid alkenes having at least 3 carbon atoms per molecule, which process comprises contacting said alkene with a catalyst consisting essentially of an alkali metal supported upon a porous adsorbent carbon, effecting said contacting at a temperature between about 50° C. and about 200° C., and recovering a polymer thus produced.

21. A process for the homopolymerization of an alkene selected from the class consisting of normally gaseous and normally liquid alkenes having at least 3 carbon atoms per molecule, which process comprises contacting said alkene and an added liquid, substantially inert hydrocarbon reaction medium with a catalyst consisting essentially of sodium supported upon an activated carbon, in which catalyst the sodium concentration is between about 3 and about 30 weight percent based on said carbon, effecting said contacting at a temperature between about 50° C. and about 200° C. and a pressure between about 25 and about 100 atmospheres, and recovering a polymer thus produced.

22. The process of claim 20 wherein said alkene is a normally gaseous alkene.

23. A process for the homopolymerization of an alkene selected from the class consisting of normally gaseous and normally liquid alkenes having at least 3 carbon atoms per molecule, which process comprises contacting said alkene with a catalyst consisting essentially of an alkali material supported upon a porous adsorbent carbon, said alkali material being selected from the group consisting of alkali metal and alkali metal hydride, effecting said contacting at a temperature between about 50° C. and about 200° C., and recovering a polymer thus produced.

24. A process for the heteropolymerization of at least two alkenes selected from the class consisting of normally gaseous and normally liquid alkenes, at least one of which contains at least 3 carbon atoms per molecule, which process comprises contacting said alkenes with a catalyst consisting essentially of an alkali material supported upon a porous, adsorbent carbon, said alkali material being selected from the group consisting of alkali metal and alkali metal hydride, effecting said contacting at a temperature between about 50° C. and about 200° C., and recovering a heteropolymer thus produced.

References Cited in the file of this patent

UNITED STATES PATENTS

| | | |
|---|---|---|
| 2,466,694 | Freed | Apr. 12, 1949 |
| 2,483,886 | Crouch | Oct. 4, 1949 |
| 2,492,693 | Freed | Dec. 27, 1949 |
| 2,771,463 | Field et al. | Nov. 20, 1956 |
| 2,795,631 | Nelson et al. | June 11, 1957 |